(12) United States Patent
Haeckel et al.

(10) Patent No.: US 8,757,668 B2
(45) Date of Patent: Jun. 24, 2014

(54) CONNECTOR WITH PRESSURE EQUALIZATION

(75) Inventors: Andre Haeckel, Waldeck (DE); Ulrich Ceblin, Bad Zwesten (DE)

(73) Assignee: TI Automotive (Fuldabruck) GmbH, Fuldabruck (DE)

( * ) Notice: Subject to any disclaimer, the term of this patent is extended or adjusted under 35 U.S.C. 154(b) by 142 days.

(21) Appl. No.: 13/408,643

(22) Filed: Feb. 29, 2012

(65) Prior Publication Data

US 2013/0220470 A1    Aug. 29, 2013

(51) Int. Cl.
    *F16L 55/00*    (2006.01)
(52) U.S. Cl.
    USPC ............... 285/187; 285/305; 138/32; 138/30; 138/28
(58) Field of Classification Search
    USPC ................ 285/187, 381.4, 381.5, 381.1, 305; 138/32, 30, 31, 27, 28
    See application file for complete search history.

(56) References Cited

U.S. PATENT DOCUMENTS

| | | | | |
|---|---|---|---|---|
| 1,369,198 | A | * | 2/1921 | Slomer ........................ 285/187 |
| 2,029,630 | A | * | 2/1936 | McMichael ..................... 138/28 |
| 3,074,437 | A | * | 1/1963 | Mercier .......................... 138/31 |
| 3,407,837 | A | * | 10/1968 | Fulton et al. ..................... 138/28 |
| 4,321,908 | A | * | 3/1982 | Reed .............................. 138/28 |
| 5,538,043 | A | * | 7/1996 | Salazar ........................... 138/28 |
| 6,009,906 | A | * | 1/2000 | Salazar ........................... 138/28 |
| 6,029,686 | A | * | 2/2000 | Pirkle ............................. 138/32 |
| 6,119,729 | A | * | 9/2000 | Oberholzer et al. ............ 138/28 |
| 7,089,962 | B2 | | 8/2006 | Bleeck et al. |
| 8,555,624 | B2 | * | 10/2013 | Lechner et al. ............... 285/305 |
| 2003/0159743 | A1 | * | 8/2003 | Kobayashi et al. ............. 138/30 |
| 2005/0263198 | A1 | * | 12/2005 | Kamada et al. ................. 138/30 |
| 2010/0064670 | A1 | | 3/2010 | Starck et al. |

FOREIGN PATENT DOCUMENTS

| | | |
|---|---|---|
| FR | 2478161 A1 | 9/1981 |
| GB | 2206666 A1 | 1/1989 |
| JP | 2010007617 A | 1/2010 |
| WO | WO 2010/023124 A1 | 3/2010 |
| WO | WO 2010/069636 A1 | 6/2010 |

OTHER PUBLICATIONS

European Patent Office, First Examination Report in European Patent Application No. 10191506.4 (May 27, 2011).

* cited by examiner

*Primary Examiner* — David E Bochna
(74) *Attorney, Agent, or Firm* — Leydig, Voit & Mayer, Ltd.

(57) ABSTRACT

A connector for connecting at least two receptor modules for a liquid medium, wherein the connector has a first connection end for the connection to a first receptor module and a second connection end for the connection to a second receptor module. The connector has a pressure equalization chamber between the first and second connection ends, in which a compressible insert is disposed. The compressible insert lies in part against the interior wall of the pressure equalization chamber. A least one longitudinal channel for a fluid communication between the first and second connection ends is provided between the interior wall of the pressure equalization chamber and the compressible insert. The compressible insert can be compacted as a result of a volume expansion of the liquid medium due to temperature conditions.

19 Claims, 2 Drawing Sheets

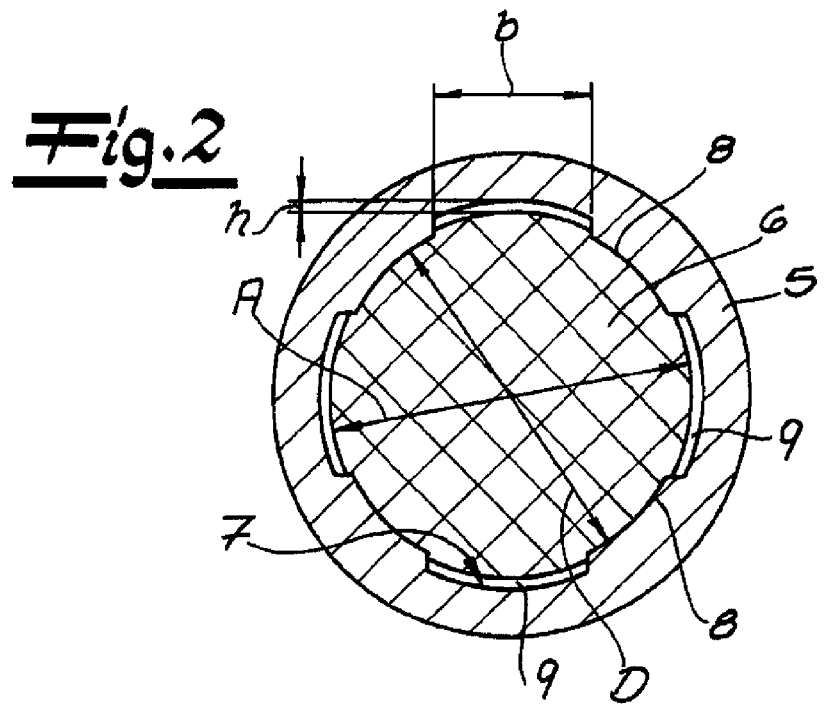
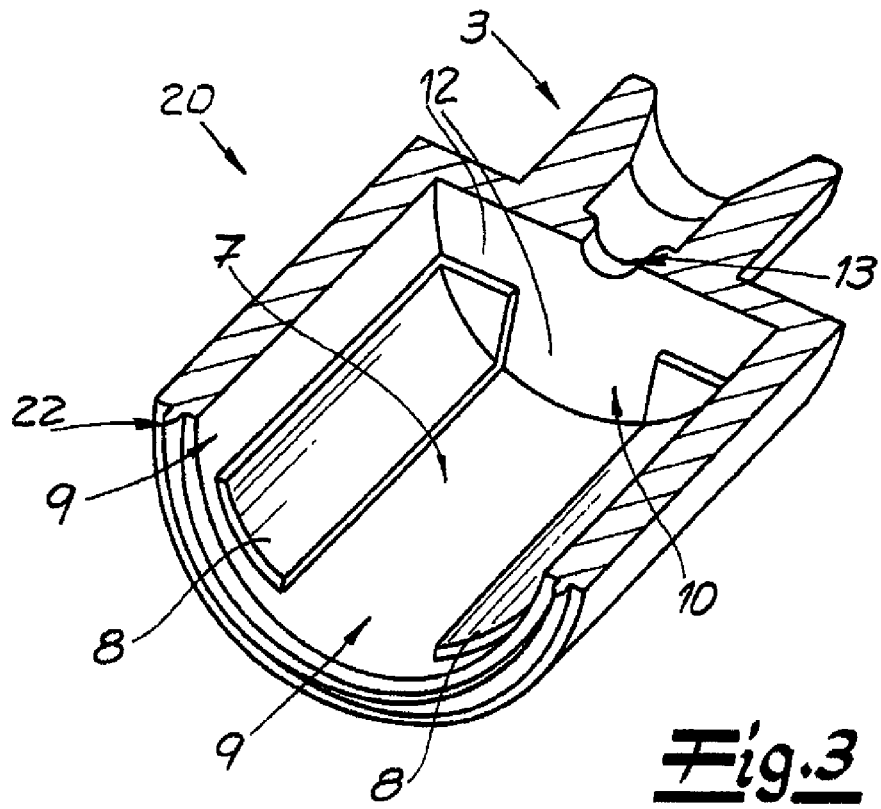

CONNECTOR WITH PRESSURE EQUALIZATION

BACKGROUND

The invention relates to a connector for connecting at least two receptor modules for a liquid medium, by way of example, for the connection of two lines for a liquid medium, wherein the connector includes a first connection end for connection of a first receptor module and a second connection end for the connection of a second receptor module, and wherein the liquid medium is able to flow between the first and second connection ends by means of the connector. The liquid medium in this case may flow from the first to the second connection end, or in the opposite direction, from the second connection end to the first connection end. A receptor module for a liquid medium means, in the framework of the invention, in particular, a line for conducting a liquid medium or a tank for a liquid medium, or a dosing unit for a liquid medium. In this case, a line can also mean a hose line, or a plastic hose. With the use of a connector according to the invention for the connection of at least one line, said connector shall hereinafter be referred to as a line connector. For practical purposes, lines can be inserted in the first connection end or the second connection end of the line connector and preferably be locked in place here.

Line connectors of the type described above are known in the field in different embodiments. In particular with lines and line connectors for the conducting of water or an aqueous medium the problem exists that at low temperatures the liquid medium freezes resulting in volume expansion. Due to said volume expansion, or respectively, because of the resulting pressure, the line and the line connector may be damaged or even fully destroyed.

Numerous measures for the solution of this problem have already been proposed in the field. For the most part, however, these measures are not satisfactory.

In motor vehicles, the so-called SCR method (Selective Catalytic Reduction) is implemented in order to reduce the nitrogen content in the exhaust. In the framework of said SCR method, an aqueous urea solution is used. In particular, with these aqueous urea solutions as well, the problem portrayed above occurs. The aqueous urea solution freezes at low temperatures in a manner analogous to water resulting in volume expansion and as a result of the corresponding pressure increase, lines, connectors and similar items in the SCR system may be damaged or fully destroyed. It is known in the field to empty, by means of a vacuum, the medium conducting lines with these SCR systems after the motor vehicle has been parked. A freezing of the aqueous medium in the lines is thereby eliminated. This method is however, extensive and subject to error.

SUMMARY OF INVENTION

The invention assumes the technical objective of providing a connector, or line connector, respectively, of the aforementioned type, by means of which the aforementioned problems can be prevented. The invention relates therein, in particular, to a connector for the connection of receptor modules for an aqueous urea solution, in particular in the framework of an SCR system.

To attain said technical objective, the invention teaches of a connector for connecting at least two receptor modules for a liquid medium, for example, line connectors for connecting two lines for a liquid medium, in particular for a urea solution, wherein the connector includes a first connection end for the connection of a first receptor module and a second connection end for the connection of a second receptor module, wherein the liquid medium is able to flow between the first and second connection ends by means of the connector, wherein the connector between the first and second connection ends includes a pressure equalization chamber, wherein a compressible insert is disposed in the pressure equalization chamber, wherein the compressible insert lies in part against the interior wall of the pressure equalization chamber, wherein at least one longitudinal channel, preferably numerous longitudinal channels, for establishing a fluid communication between the first and second connection ends, is disposed between the interior wall of the pressure equalization chamber and the compressible insert, and wherein, in the case of a volume expansion of the liquid medium due to temperature conditions, the compressible insert can be compacted, in particular, can be compacted towards the middle of the pressure equalization chamber.

That the, at least one, longitudinal channel is provided for a fluid communication between the first and second connection ends means, in the framework of the invention, that the liquid medium can flow through the longitudinal channel from the first to the second connection end and in the reverse direction. With the volume expansion of the fluid medium due to temperature conditions, a volume expansion, in particular as a result of freezing of the liquid, is meant.

In the framework of the invention, it is the case that the connector according to the invention consists of plastic, or substantially consists of plastic. According to a preferred embodiment of the invention the housing of the connector consists of polyamide and preferably of fiberglass reinforced polyamide. The housing of the connector can however also consist, in particular, of polyphthalamide (PPA) or fiberglass reinforced polyphthalamide, or of a fluoroplastic or a fiberglass reinforced fluoroplastic. For practical purposes, the material for the housing of the connector is selected with the stipulation that a firmly bonded connection of the housing to a line consisting of plastic that is to be connected to said is possible. The firmly bonded connection is thereby preferably created by means of a welding process and in particular by means of rotation welding. The connector is preferably a so-called quick connector.

In the framework of the invention, it is the case that the liquid medium, in particular the urea solution, flows through the connector in the longitudinal direction. For practical purposes the connector consists substantially of cylindrical sections, disposed successively in the longitudinal direction. Preferably, the first connection end, the pressure equalization chamber and second connection end are disposed successively in the longitudinal direction of the connector. It is recommended that a longitudinal axis run in a longitudinal direction of the connector through the first connection end and/or through the pressure equalization chamber and/or through the second connection end and, particularly preferred, centrally through the first connection end and/or through the pressure equalization chamber and/or through the second connection end.

For practical purposes, the pressure equalization chamber is cylindrical in design and it is preferred that the compressible insert is also designed to be cylindrical, or substantially cylindrical in shape, respectively. The pressure equalization chamber consists preferably of plastic and in particular of a fiberglass reinforced plastic. With respect to the preferred material selected for the pressure equalization chamber, reference may be made to the materials given above for the housing of the connector. With the pressure equalization chamber preferably consisting of plastic, it is recommended that it be made of numerous pieces, for practical purposes of two pieces joined together, wherein the pieces are connected together by means of a welding process.

As previously mentioned, the liquid medium, according to a particularly preferred embodiment of the invention, is a urea solution, or an aqueous urea solution. It is recommended that the connector according to the invention, or the receptor module connected to said, respectively, are deployed in an SCR system. In such an SCR system, the solution to the objective according to the invention has proven to be particularly successful.

In the framework of the invention it is the case that the compressible insert disposed in the pressure equalization chamber is reversibly malleable. With a volume expansion due to the freezing of the liquid medium, the compressible insert is compacted, and with a subsequent volume reduction due to thawing, the compressible insert preferably assumes its original shape. For practical purposes, the compressible insert consists of an elastic material, in particular an elastic synthetic material.

According to a particularly preferred embodiment of the invention, the compressible insert consists of a plastic foam, preferably a closed cell plastic foam. For practical purposes the compressible insert consists of a plastic foam of rubber, particularly preferred is a plastic foam of EPDM (ethylene-propylene-diene-monomer rubber). In the framework of the invention, it is the case that the compressible insert consists of a more than 50% volume, preferably more than 65% volume, and particularly preferred more than 80% volume, plastic foam, in particular of a closed cell plastic foam and it is recommended that it be of a closed cell plastic foam of rubber or, respectively EPDM. One embodiment, in which the compressible insert consists of more than 90% volume, preferably more than 95% volume closed cell EPDM plastic rubber has proven to be particularly successful. It is suggested that the surface of the compressible insert is sealed, or formed by a sealed outer skin.

According to a preferred embodiment variation of the invention, the material of the compressible insert has a density of 0.5-0.7 $g/cm^3$, in particular a density of 0.55-0.65 $g/cm^3$ According to a highly recommended embodiment of the invention, the compressible insert is designed to be compact. In this case, compact means that the compressible insert contains no hollow chambers, or no larger hollow chambers, respectively. If the compressible insert according to a preferred embodiment consists of a plastic foam, in particular a closed cell plastic foam, the compressible insert has no hollow chambers, or larger hollow chambers, aside from the pores, or cells.

It is recommended that the compressible insert have a hardness of 2-5 Shore A, preferably 3-20 Shore A, and very preferred is 4-18 Shore A (hardness measured according to DIN 53505). According to a proven embodiment of the invention, the compressible insert has a compression set (DIN 53572, 22 hours, 70° C., 50% deformation) of 0-55%, preferred is 20-50%, and highly preferred is 25-47%.

According to one preferred embodiment of the invention, the compressible insert is partially subjected to a preload at the interior wall of the pressure equalization chamber. In the framework of the invention it is the case that the longitudinal channels are disposed over the circumference of the compressible insert, wherein the longitudinal channels are separated from one another by longitudinal ridges. According to a recommended embodiment variation, the longitudinal ridges extend from the interior wall of the pressure equalization chamber. It has proven beneficial that the compressible insert—preferably preloaded—lies against said. For practical purposes, the longitudinal channels are incorporated, or embedded, respectively, in the interior wall of the pressure equalization chamber. Preferably the longitudinal channels are distributed over the circumference of the interior wall, or over the circumference of the compressible insert at equal distances from one another, or respectively, at substantially equal distances from one another. For practical purposes, the longitudinal ridges are then of uniform width, or substantially uniform with, respectively. In the framework of the invention, it is the case that the longitudinal channels and longitudinal ridges extend along the longitudinal direction or, respectively, in the direction of the longitudinal axis L of the connector. It is recommended that the longitudinal channels and longitudinal ridges are disposed parallel to, or substantially parallel to, the longitudinal axis L of the connector. Preferably, at least two, preferably at least three, and very preferably, at least four longitudinal channels are provided.

As already explained above, according to a recommended embodiment of the invention, the pressure equalization chamber and/or the compressible insert are of a cylindrical design. According to one embodiment variation, the longitudinal ridges separating the longitudinal channels from one another extend from the cylindrical interior wall of the pressure equalization chamber. In the framework of the invention it is the case that the compressible insert is disposed coaxially in the pressure equalization chamber, and that the pressure equalization chamber and the compressible insert share a common central longitudinal axis.

A particularly preferred embodiment of the invention is characterized in that the pressure equalization chamber has both a first end surface and a second end surface on the interior wall running over its interior circumference, and that between the compressible insert and the first end surface and/or between the compressible insert and the second end surface, cross channels are provided for a fluid communication with the longitudinal channels. Preferably, for this the first end surface is designated to the first connection end of the connector, and the second end surface is designated to the second connection end of the connector. For practical purposes, the pressure equalization chamber is cylindrically designed, and forms the interior wall of the cylinder shell, and the two end surfaces form the faces of the cylinder. That in the first and/or second end surfaces, cross channels are provided for a fluid communication with the longitudinal channels, means in the framework of the invention that the liquid medium can flow via the cross channels to the longitudinal channels, or, respectively, can flow from the longitudinal channels into the cross channels. It is the case in the framework of the invention that numerous cross channels are provided in both the first end surface and the second end surface. For practical purposes the cross channels run crosswise and preferably perpendicular, or substantially perpendicular to the longitudinal channels. According to a preferred embodiment variation, the cross channels are disposed in a star shape or cross shape on an end surface. Preferably, the number of cross channels disposed on an end surface corresponds to the number of longitudinal channels between the interior wall and the compressible insert. It is the case in the framework of the invention that the cross channels are connected directly to the longitudinal channels. Depending on the direction of flow of the liquid medium, the liquid medium can flow via the cross channels in the first end surface into the longitudinal channels and from the longitudinal channels into the cross channels of the second end surface, or in the reverse direction.

A recommended embodiment of the invention is characterized in that a fluid line of the first connection end connected directly to the pressure equalization chamber, or a fluid line of the second connection end connected directly to the pressure equalization chamber, has an interior diameter d, which is smaller than one half, preferably smaller than one third, more preferably small than one fourth, and very preferably smaller than on fifth of the interior diameter D of the pressure equalization chamber. The interior diameter d of the fluid line is measured for this at a right angle to its longitudinal axis, or the direction of flow, respectively. The interior diameter D of the pressure equalization chamber is measured at a right angle to the longitudinal axis, preferably at a right angle to the cylindrical axis of the pressure equalization chamber, and this preferably in the region of the longitudinal ridges. It is the case in the framework of the invention that at least one fluid line, preferably both fluid lines, is/are in direct communication by means of the cross channels with the longitudinal channels.

The ratio of the length l of the compressible insert (measured along the longitudinal axis of the compressible insert, or the pressure equalization chamber) to the external diameter A of the compressible insert is 1.1-1.5, and preferably 1.25-1.35. The external diameter A of the compressible insert is measured for this at a right angle to said longitudinal axis in the region of the longitudinal channels. It is recommended that the ratio of the external diameter A of the compressible insert in the region of the longitudinal channels to the height h of the longitudinal channels is 20-50, preferably 25-45, more preferably 30-40, and very preferably 32-38. The height h of the longitudinal channels in this case means the distance of the compressible insert from the interior wall of the pressure equalization chamber in the region of the longitudinal channels. It is recommended that the ratio of the outer diameter A of the compressible insert to the width b of the longitudinal channels be 1.5-3.5, for practical purposes 1.8-2.8, preferably 2.0-2.6, and very preferably 2.1-2.5. The width b of the longitudinal channels is measured for this at a right angle to the length l of the compressible insert. It is recommended that the longitudinal channels extend over the entire length l of the compressible insert, and this, for practical purposes in a linear, and preferably parallel direction to the longitudinal axis of the compressible insert or the pressure equalization chamber, respectively.

The subject matter of the invention is also a line connector configuration with at least one line and at least one line connector, of the type describe above, connected to one end of the line. According to a preferred embodiment, at least one line is provided and a line connector according to the invention of the type described above is connected on each end of said line. In this manner, the line thereby connects two line connectors according to the invention. It is the case in the framework of the invention that another line is connected in each case on the respective other end of the line connector. The provision of a line connector at each end of the line has proven particularly beneficial with respect to the solution to the technical objective, or respectively, with respect to an effective frost protection for the line.

A preferred embodiment of the invention is characterized in that the line connector has a receptor for a line at one connection end and that this receptor is designed to form a firmly bonded connection, in particular a firmly bonded connection by means of a welding process, preferably a rotation welding process. It is the case in the framework of the invention that at least the firmly bonded portion of the line connector that is to be connected, and the line, consist of plastic, wherein said plastics are either identical or at least compatible with the specified firmly bonded connection. The connection of the line to the connection ends can however be formed by means of sliding the line onto a fir-tree end or crimping.

According to a recommended embodiment variation, the line connector has a female coupling receptor at one end for receiving a male adaptor or plug of a line. As a rule, this connection end could also be equipped with a male coupling or adaptor. In this case, it would then be preferably a quick connector adaptor of the type SAE J2044.

The invention is based on the knowledge that with a connector according to the invention, or respectively, with a line connector configuration according to the invention, volume expansion of the liquid medium due to temperature conditions in the connected receptor modules, or in the line connectors, respectively, can be compensated for readily, reliably, and effectively. Damage to, or destruction of, the receptor modules or the line connectors can be effectively prevented using the measures according to the invention. It should be noted here that the connectors according to the invention, or the line connector configuration according to the invention, in particular in SCR systems with aqueous urea solutions can be particularly effectively implemented. Furthermore it should be noted that the success in accordance with the invention can be attained with relatively simple and cost-effective means.

DESCRIPTION OF THE DRAWINGS

In the following, the invention shall be explained in greater detail based on illustrations showing a single embodiment example. They show in a schematic presentation.

DESCRIPTION OF ILLUSTRATED EMBODIMENT

Figure 1:
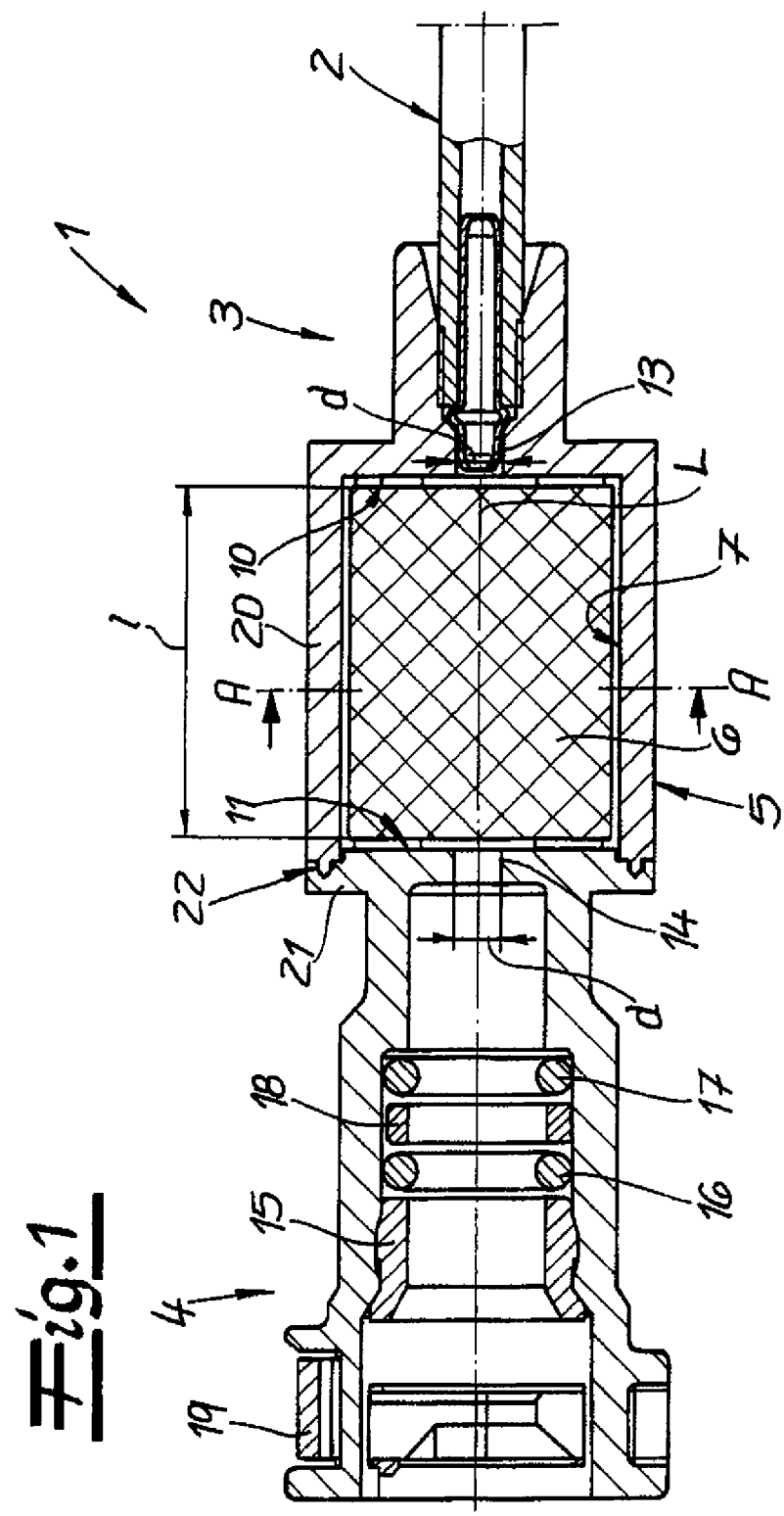
FIG. 1 A side view in a cut-away illustration of a line connector according to the invention, FIG. 2 A cross-section cut along the line A-A of the subject matter of FIG. 1, and FIG. 3 A perspective view of a cut through the pressure equalization chamber of the subject matter of FIG. 1.

The figures show a connector 1 for connecting receptor modules for a liquid medium. The liquid medium (not shown) is preferably, and in the embodiment example, an aqueous urea solution, and the connector 1 shown is, for practical purposes, and in the embodiment example, to be implemented in the framework of an SCR system for a motor vehicle. In the embodiment example according to FIG. 1, a line 2 is connected to the first connection end 3. A line 2 (not shown) can also be connected to the second connection end 4 as well. It is, however, also possible to connect another receptor module in the form of a tank (not shown) or a dosing unit (not shown) at this point. The liquid medium, preferably the urea solution, can flow through the connector 1 between the first connection end 3 and the second connection end 4.

According to the invention, the connector 1 has a pressure equalization chamber 5 between the first connection end 3 and the second connection end 4, in which a compressible insert 6 is disposed. Preferably, and in the embodiment example, the compressible insert 6 consists of a closed cell EPDM plastic foam. The compressible insert 6 is compact thereby. Compact, in this case, means that aside from the pores, or cells, respectively, of the plastic foam, the compressible insert 6 contains no further hollow chambers. It is recommended that, and in the embodiment example it is the case that, the pressure equalization chamber 5 is cylindrical. The compressible insert 6 inserted or disposed in the pressure equalization chamber 5 is also substantially cylindrical in shape.

It can be seen in FIG. 2 that the compressible insert 6 lies in part against the interior wall 7 of the pressure equalization chamber 5, and this is in the region of the longitudinal ridges 8 extending from the interior wall 7. It is further more visible in FIG. 2 that between the interior wall 7 of the cylindrical pressure equalization chamber 5 and the compressible insert 6, numerous longitudinal channels 9 are provided for a fluid communication between the first and second connection ends 3, 4. The compressible insert 6 furthermore is subjected to a pre-load preferably and in the embodiment example, is lying against the interior wall 7 of the pressure equalization chamber 5. With a volume expansion due to temperature conditions of the liquid medium—in particular with a freezing of the liquid medium resulting in volume expansion—the compressible insert 6 can be compacted towards the middle of the pressure equalization chamber 5. It is recommended that the compressible insert 6 be reversibly malleable for this.

FIG. 2 shows that in the embodiment example, four longitudinal channels 9 are disposed, having the same distance separating one another, distributed over the circumference of the compressible insert 6, wherein said longitudinal channels 9 are separated from one another by the four longitudinal ridges 8 on the interior wall 7. Preferably, and in the embodiment example, the longitudinal channels 9 and the longitudinal ridges 8 run parallel to the longitudinal axis L of the connector 1. The compressible insert 6 is inserted coaxially in the pressure equalization chamber 5, such that the compressible insert 6 and the pressure equalization chamber 5 share the same central longitudinal axis L.

In the embodiment example, the pressure equalization chamber 5 has both a first end wall 10 designated to the first connection end 3, and a second end wall 11 designated to the second connection end 4, running over interior breadth of the interior wall 7. The interior wall 7 forms thereby the cylindrical shell and the end walls 10, 11 form the end surfaces of the cylindrical hollow chamber of the pressure equalization chamber 5. Between the compressible insert 6 and the first end wall 10, as well as between the compressible insert 6 and the second end wall 11, cross channels 12 are provided to form a fluid communication with the longitudinal channels 9. The cross channels 12 are formed into the end walls 10, 11 and are preferably, and in the embodiment example, disposed perpendicular to the longitudinal channels 9. Furthermore, in the embodiment example there are four cross channels 12 on each end wall 10, 11, disposed in a crossing configuration. The cross channels 12 are connected directly to the designated longitudinal channels 9.

Preferably, and in the embodiment example (FIG. 1) a first fluid line 13 designated to the first connection end 3 is connected directly to the pressure equalization chamber 5 and a second fluid line 14 designated to the second connection end 4 is connected directly to the pressure equalization chamber 5. For practical purposes, and in the embodiment example, the longitudinal axes of these fluid lines correspond to the central longitudinal axis L of the connector 1. Both fluid lines have an interior diameter d, which it is recommended that, and in the embodiment example is the case that, it be smaller than one fourth of the interior diameter D of the pressure equalization chamber 5. The interior diameter D of the pressure equalization chamber 5 is measured for this in the region of the longitudinal ridges 8. The fluid lines 13, 14 are furthermore connected to the longitudinal channels 9 by means of the cross channels 12. For practical purposes, and in the embodiment example, the longitudinal channels extend over the entire length l of the compressible insert 6, and this, for practical purposes, in a linear and preferably parallel manner to the longitudinal axis L of the connector 1.

The external diameter, furthermore, of the compressible insert 6 is indicated by the letter A, which is measured in the region of the longitudinal channels 9. The height h of the longitudinal channels 9 corresponds to the distance separating the compressible insert 6 from the interior wall 7 of the pressure equalization chamber 5 in the region of the longitudinal channels 9. The width of the longitudinal channels 9 is indicated by the letter b, which is measured at a right angle to the length l of the compressible insert.

The connector shown in the figures is preferably, and in the embodiment example, designed as a quick connector. The second connection end 4 is, in particular, configured for the reception of a plug or adaptor of a receptor module, or a line, respectively. An external spacing element 15, two sealing gaskets 16, 17 designed as O-rings, and an inner spacing element 18 disposed between the two sealing gaskets are provided in the second connection end 4 (FIG. 1). Furthermore, there is a retaining element 19 for locking the plug or adapter (not shown) in place.

It can be seen in FIG. 1 that the line 2 illustrated here is inserted in a receptor of the first connection end 3. Preferably the line 2 is connected to the first connection end 3 in a firmly bonded manner, and preferably the firmly bonded connection is produced by means of a rotation welding process. For this, the first connection end 3 and the line 2 consist, for practical purposes, of a plastic compatible with a firmly bonded connection.

It is furthermore visible in FIG. 1 that the second connection end 4 is configured in the form of a female coupling receptor for receiving a male adaptor or plug of a line 2. As a rule, a male coupling component can also be provided on the second line end 4, in particular in the form of an adaptor of the type SAE J2044.

From FIG. 1 one can also derive that the pressure equalization chamber 5 is designed, preferably, and in the embodiment example, in two sections. It is recommended that the two sections 20, 21 of the pressure equalization chamber are connected in a firmly bonded manner at the point of connection 22, in particular, they are welded together. It is the case in the framework of the invention that the two sections 20, 21 of the pressure equalization chamber 5 consist of a plastic compatible to a firmly bonded connection.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

The invention claimed is:

1. A connector for connecting at least two lines for containing a liquid medium, wherein said connector has a first connection end for connecting to a first receptor module and a second connection end for connecting to a second receptor module, wherein the liquid medium can flow through said connector between said first and second connection ends wherein said connector has a pressure equalization chamber between said two connection ends, and includes an interior wall, wherein a compressible insert is disposed in said pressure equalization chamber, wherein said compressible insert lies in part against an interior wall of said pressure equalization chamber, wherein a least one longitudinal channel is defined between said interior wall of said pressure equalization chamber and said compressible insert to form a fluid communication between said first and said second connection ends, and wherein, said compressible insert can be compacted within said pressure equalization chamber in response to a volume expansion of the liquid medium due to temperature conditions and, wherein said interior wall of said pressure equalization chamber includes at least one longitudinal channel for said fluid communication between said first and said second connection ends between said interior wall of said pressure equalization chamber and said compressible insert.

2. The connector according to claim 1, wherein the liquid medium is a urea solution.

3. The connector according to claim 1, wherein said compressible insert is reversibly malleable.

4. The connector according to claim 3, wherein said compressible insert consists of a plastic foam, preferably a closed cell plastic foam.

5. The connector according to claim 4, wherein said compressible insert consists of a plastic foam made of rubber.

6. The connector according to claim 5 wherein said compressible insert comprises a plastic foam made of ethylene-propylene-diene-monomer rubber (EPDM).

7. The connector according to claim 4, wherein said compressible insert comprises more than fifty percent (50%) by volume of closed cell plastic foam.

8. The connector according to claim 7, wherein said compressible insert includes a sealed outer skin.

9. The connector according to claim 1, wherein said compressible insert has a hardness (DIN 53505) of 2 to 25 Shore A, and/or a compression set (DIN 53572, 22 hours, 70° C., 50% deformation) of 0 to 55%.

10. The connector according to claim 9 wherein the hardness of said compressible insert is preferably 3 to 20 Shore A and the compression set is preferably 20 to 50%.

11. The connector according to claim 1, wherein said compressible insert is subjected to a preload, against portions of said interior wall of said pressure equalization chamber.

12. The connector according to claim 1, wherein said interior wall of said pressure equalization chamber defines a plurality of longitudinal channels.

13. The connector according to claim 12, wherein said longitudinal channels are distributed over the circumference of said compressible insert and wherein said longitudinal channels are separated from one another by longitudinal ridges on said interior wall of said pressure equalization chamber.

14. The connector according to claim 1, wherein said pressure equalization chamber has both a first end wall and a second end wall extending the interior breadth of said interior wall and wherein at least one cross channel is provided, in a fluid communication with said at least one longitudinal channel.

15. The connector according to claim 14, wherein at least one of said fluid lines is connected to at least one longitudinal channel by means of said at least one cross channel.

16. The connector according to claim 14 wherein said pressure equalization chamber has a plurality of longitudinal channels extending between said end walls and said end walls include a plurality of cross channels communicating with said longitudinal channels.

17. The connector according to claim 1, wherein said connector includes a fluid line at said first connection end connected to said pressure equalization chamber, and a fluid line at said second connection end connected to said pressure equalization chamber, each having an internal diameter d, which is smaller than one half of the internal diameter D of said pressure equalization chamber.

18. The connector according to claim 1, wherein said pressure equalization chamber is constructed of two sections and wherein said sections are connected to one another in a firmly bonded manner.

19. The connector according to claim 1, wherein at least one of said connection ends defines a quick connector body to releasably connect to a fluid line, wherein said connection end of said body includes a tube receiving portion and a retaining element to releasably lock said tube to said connector body and seals for sealing said tube to said connector body.

* * * * *